United States Patent
Hwang et al.

(10) Patent No.: US 12,431,150 B2
(45) Date of Patent: Sep. 30, 2025

(54) METHOD AND APPARATUS FOR RECONSTRUCTING VOICE CONVERSATION

(71) Applicant: LLSOLLU CO., LTD., Seoul (KR)

(72) Inventors: Myeongjin Hwang, Seoul (KR); Suntae Kim, Seoul (KR); Changjin Ji, Seoul (KR)

(73) Assignee: LLSOLLU CO., LTD., Seoul (KR)

( * ) Notice: Subject to any disclaimer, the term of this patent is extended or adjusted under 35 U.S.C. 154(b) by 357 days.

(21) Appl. No.: 18/118,682

(22) Filed: Mar. 7, 2023

(65) Prior Publication Data
US 2023/0223032 A1 Jul. 13, 2023

Related U.S. Application Data

(63) Continuation-in-part of application No. 17/198,046, filed on Mar. 10, 2021, now abandoned.

(30) Foreign Application Priority Data
Mar. 10, 2020 (KR) .................. 10-2020-0029826

(51) Int. Cl.
*G10L 25/87* (2013.01)
*G10L 15/22* (2006.01)
*G10L 19/022* (2013.01)

(52) U.S. Cl.
CPC .......... *G10L 19/022* (2013.01); *G10L 15/22* (2013.01); *G10L 25/87* (2013.01)

(58) Field of Classification Search
CPC ....... G10L 19/022; G10L 15/22; G10L 25/87; G10L 15/04; G10L 17/00
See application file for complete search history.

(56) References Cited

U.S. PATENT DOCUMENTS

| 6,055,495 A * | 4/2000 | Tucker | G06F 3/16 704/200 |
| 7,295,970 B1 * | 11/2007 | Gorin | G10L 17/12 704/231 |

(Continued)

FOREIGN PATENT DOCUMENTS

| CN | 1629935 A | 6/2005 |
| CN | 1708997 A | 12/2005 |

(Continued)

OTHER PUBLICATIONS

Hotta, et al., "Detecting Whether Incorrectly-Segmented Utterance Needs to be Restored or not", SIG-SLUD-B303, pp. 45-52 (Feb. 26, 2014).

(Continued)

*Primary Examiner* — Fariba Sirjani
(74) *Attorney, Agent, or Firm* — Knobbe Martens Olson & Bear LLP

(57) ABSTRACT

A voice conversation reconstruction method performed by a voice conversation reconstruction apparatus is disclosed. The method includes acquiring speaker-specific voice recognition data about voice conversation, dividing the speaker-specific voice recognition data into a plurality of blocks using a boundary between tokens according to a predefined division criterion, arranging the plurality of blocks in chronological order irrespective of a speaker, merging blocks from continuous utterance of the same speaker among the arranged plurality of blocks, and reconstructing the plurality of blocks subjected to the merging in a conversation format in chronological order and based on a speaker.

8 Claims, 5 Drawing Sheets

(56) References Cited

U.S. PATENT DOCUMENTS

| | | |
|---|---|---|
| 7,668,718 B2 | 2/2010 | Kahn et al. |
| 10,089,067 B1 | 10/2018 | Abuelsaad et al. |
| 10,636,427 B2 | 4/2020 | Jung et al. |
| 12,380,910 B2* | 8/2025 | Kukde ............... G10L 21/0272 |
| 2004/0162724 A1 | 8/2004 | Hill et al. |
| 2006/0149558 A1* | 7/2006 | Kahn ................. G10L 15/063 |
| | | 704/278 |
| 2008/0154594 A1 | 6/2008 | Itoh et al. |
| 2009/0265166 A1 | 10/2009 | Abe |
| 2010/0305945 A1 | 12/2010 | Krishnaswamy et al. |
| 2014/0074467 A1* | 3/2014 | Ziv ....................... G10L 25/51 |
| | | 704/235 |
| 2016/0283185 A1* | 9/2016 | McLaren ............. G06F 16/683 |
| 2018/0020285 A1 | 1/2018 | Zass |
| 2019/0080688 A1 | 3/2019 | Itsui |
| 2019/0318743 A1* | 10/2019 | Reshef ................. G10L 25/78 |
| 2019/0392837 A1 | 12/2019 | Jung et al. |
| 2020/0135204 A1* | 4/2020 | Robichaud ........... G10L 25/78 |
| 2020/0175961 A1* | 6/2020 | Thomson ............. G10L 15/28 |
| 2024/0126994 A1* | 4/2024 | Deilamsalehy ...... H04N 5/9305 |

FOREIGN PATENT DOCUMENTS

| | | |
|---|---|---|
| CN | 107430626 A | 12/2017 |
| CN | 107430853 A | 12/2017 |
| CN | 110851470 A | 2/2020 |
| JP | 2000-112931 A | 4/2000 |
| JP | 2012-003701 A | 1/2012 |
| JP | 2016-085697 A | 5/2016 |
| JP | 2017-161850 A | 9/2017 |
| JP | 2017-182822 A | 10/2017 |
| JP | 6517419 B1 | 5/2019 |
| KR | 10-2014-0078258 | 6/2014 |
| KR | 10-2019-0125154 A | 11/2019 |
| KR | 10-2020-0011198 A | 2/2020 |
| WO | WO 2009/104332 A1 | 8/2009 |
| WO | WO 2010/113438 A1 | 10/2010 |

OTHER PUBLICATIONS

Office Action in Japanese Application No. 2021-038052 dated May 29, 2024 and English translation.

Office Action in Korean Application No. 10-2020-0029826 dated Jun. 25, 2020 and English translation.

First Office Action in CN Application No. 202110255584.7 dated Sep. 22, 2023.

Notice of Allowance in JP Application No. 2021-038052 dated Apr. 15, 2025.

* cited by examiner

FIG. 5

| S210 | Acquiring | E2: ( T4 )<br>E1: ( T1, T2, T3, T5, T6 )<br>E1: ( T10 )<br>P2: ( T7, T8, T9, T11, T12 )<br>P1: ( T13 ) |
|---|---|---|
| S220 | partition | E2T4,<br>E1T1, E1T2, E1T3, E1T5, E1T6,<br>E1T10,<br>P2T7, P2T8, P2T9, P2T11, P2T12,<br>P1T13 |
| S230 | arrangement | E1T1, E1T2, E1T3, E2T4, E1T5,<br>E1T6, P2T7, P2T8, P2T9, E1T10,<br>P2T11, P2T12, P1T13 |
| S240 | Merging | ( E1T1, E1T2, E1T3 )<br>( E2T4 )<br>( E1T5, E1T6 )<br>( P2T7, P2T8, P2T9 )<br>( E1T10 )<br>( P2T11, P2T12 )<br>( P1T13 ) |
| S250 | reconstruction | E1: ( T1, T2, T3 )<br>E2: ( T4 )<br>E1: ( T5 T6 )<br>P2: ( T7 T8 T9 )<br>E1: ( T10 )<br>P2: ( T11 T12 )<br>P1: ( T13 ) |
| S260 | output | T1, T2, T3<br>                                     T4<br>T5 T6<br>                             T7 T8 T9<br>T10<br>                           T11 T12<br>T13 |

E1: Recognition result of speaker 1 by EPD

E2: Recognition result of speaker 2 by EPD

P1: Recognition result of speaker 1 by partial result

P2: Recognition result of speaker 2 by partial result

T1~T13: Recognition result tokens. Numbers represent chronological order

METHOD AND APPARATUS FOR RECONSTRUCTING VOICE CONVERSATION

CROSS-REFERENCE TO RELATED APPLICATION

This application claims priority to and the benefit of Korean Patent Application No. 10-2020-0029826, filed on Mar. 10, 2020, the disclosure of which is incorporated herein by reference in its entirety.

BACKGROUND

1. Field of the Invention

The present disclosure relates to a method and apparatus for reconstructing speaker-specific voice recognition data about voice conversation in a conversation format.

2. Description of the Related Art

Among techniques for processing natural language inputs, STT (Speech-To-Text) is a voice recognition technique that converts speech into text.

The voice recognition techniques may be classified into two schemes. In a first scheme, all voices to be converted are converted at once. In a second scheme, a voice generated in real time is received on a predetermined time basis, for example, on a basis of a time of less than 1 second, and is converted in real time.

In the first scheme, a recognition result is generated after the entire input voice is recognized. In the second scheme, points in time at which the result of voice recognition is generated should be defined.

In the second scheme, there are largely three methods for defining the time points at which recognition results are generated. First, the recognition result may be generated at a time when a special end signal such as recognition/call termination button manipulation is received. Second, the recognition result may be generated at a time when EPD (End Point Detection) occurs, for example, silence lasts for a predetermined time, for example, 0.5 seconds, or more. Third, the recognition result may be generated every predetermined time.

The third method of defining a recognition result generation time is partial in that a time at which the recognition result is generated is a time at which continuous speech is not terminated, that is, in the middle of conversation. Therefore, the third method is mainly used to temporarily obtain a recognition result for a duration from a predetermined point in time to a current time rather than to generate a formal result. Thus, the obtained result is referred to as a partial result.

Unlike the recognition result based on an EPD boundary, the current recognition result of the partial result may include a previously-generated result. For example, in the recognition based on the EPD, results of "A B C," "D E," "F G H" may be generated to recognize "A B C D E F G H". The partial result typically includes previously generated results such as "A," "A B," "A B C," "D," "D E," "F," "F G," and "F G H" as long as EPD does not occur.

Further, the voice recognition technique has recently improved accuracy of voice recognition. However, when recognizing a conversation involving multiple speakers, a voice may not be accurately recognized in the duration for which voices overlap in a situation where two or more persons speak at the same time, and a speaker uttering specific speech may not be accurately identified.

Accordingly, in a commercial system, each input device is used per speaker and voice is recognized per speaker to generate and acquire speaker-specific voice recognition data.

When generating and acquiring voice recognition data for each speaker in a voice conversation, the acquired speaker-specific voice recognition data must be reconstructed in a conversation format. Thus, reconstruction of the speaker-specific voice recognition data in a conversation format is being studied.

Prior art literature includes Korean Patent Application Publication No. 10-2014-0078258 (Jun. 25, 2014).

SUMMARY OF THE INVENTION

Therefore, the present disclosure has been made in view of the above problems, and it is an object of the present disclosure to provide a voice conversation reconstruction method and apparatus which provide conversation reconstruction as close to the flow of actual conversation as possible in reconstructing speaker-specific voice recognition data about voice conversation in a conversation format.

Objects of the present disclosure are not limited to the above-mentioned objects. Other purposes and advantages in accordance with the present disclosure as not mentioned above will be clearly understood from the following detailed description.

In accordance with a first aspect of the present disclosure, there is provided a voice conversation reconstruction method performed by a voice conversation reconstruction apparatus, the method including: acquiring speaker-specific voice recognition data about voice conversation; dividing the speaker-specific voice recognition data into a plurality of blocks using a boundary between tokens according to a predefined division criterion; arranging the plurality of blocks in chronological order irrespective of a speaker; merging blocks from continuous utterance of the same speaker among the arranged plurality of blocks; and reconstructing the plurality of blocks subjected to merging in a conversation format in chronological order and based on a speaker.

In accordance with another aspect of the present disclosure, there is provided a voice conversation reconstruction apparatus including: an input unit for receiving voice conversation input; and a processor configured to process voice recognition of the voice conversation received through the input unit, wherein the processor is configured to: acquire speaker-specific voice recognition data about voice conversation; divide the speaker-specific voice recognition data into a plurality of blocks using a boundary between tokens according to a predefined division criterion; arrange the plurality of blocks in chronological order irrespective of a speaker; merge blocks from continuous utterance of the same speaker among the arranged plurality of blocks; and reconstruct the plurality of blocks subjected to merging in a conversation format in chronological order and based on a speaker.

In accordance with another aspect of the present disclosure, there is provided a computer-readable recording medium storing therein a computer program, wherein the computer program includes instructions for enabling, when the instructions are executed by a processor, the processor to: acquire speaker-specific voice recognition data about voice conversation; divide the speaker-specific voice recognition data into a plurality of blocks using a boundary between tokens according to a predefined division criterion; arrange the plurality of blocks in chronological order irrespective of a speaker; merge blocks from continuous utterance of the same speaker among the arranged plurality of blocks; and reconstruct the plurality of blocks subjected to merging in a conversation format in chronological order and based on a speaker.

In accordance with another aspect of the present disclosure, there is provided a computer program stored in a computer-readable recording medium, wherein the computer program includes instructions for enabling, when the instructions are executed by a processor, the processor to: acquire speaker-specific voice recognition data about voice conversation; divide the speaker-specific voice recognition data into a plurality of blocks using a boundary between tokens according to a predefined division criterion; arrange the plurality of blocks in chronological order irrespective of a speaker; merge blocks from continuous utterance of the same speaker among the arranged plurality of blocks; and reconstruct the plurality of blocks subjected to merging in a conversation format in chronological order and based on a speaker.

BRIEF DESCRIPTION OF THE DRAWINGS

The above and other objects, features and other advantages of the present disclosure will be more clearly understood from the following detailed description taken in conjunction with the accompanying drawings, in which:

FIG. 5 shows a step-by-step example of a method for reconstructing a voice conversation according to one embodiment.

DETAILED DESCRIPTION OF THE INVENTION

Figure 1:
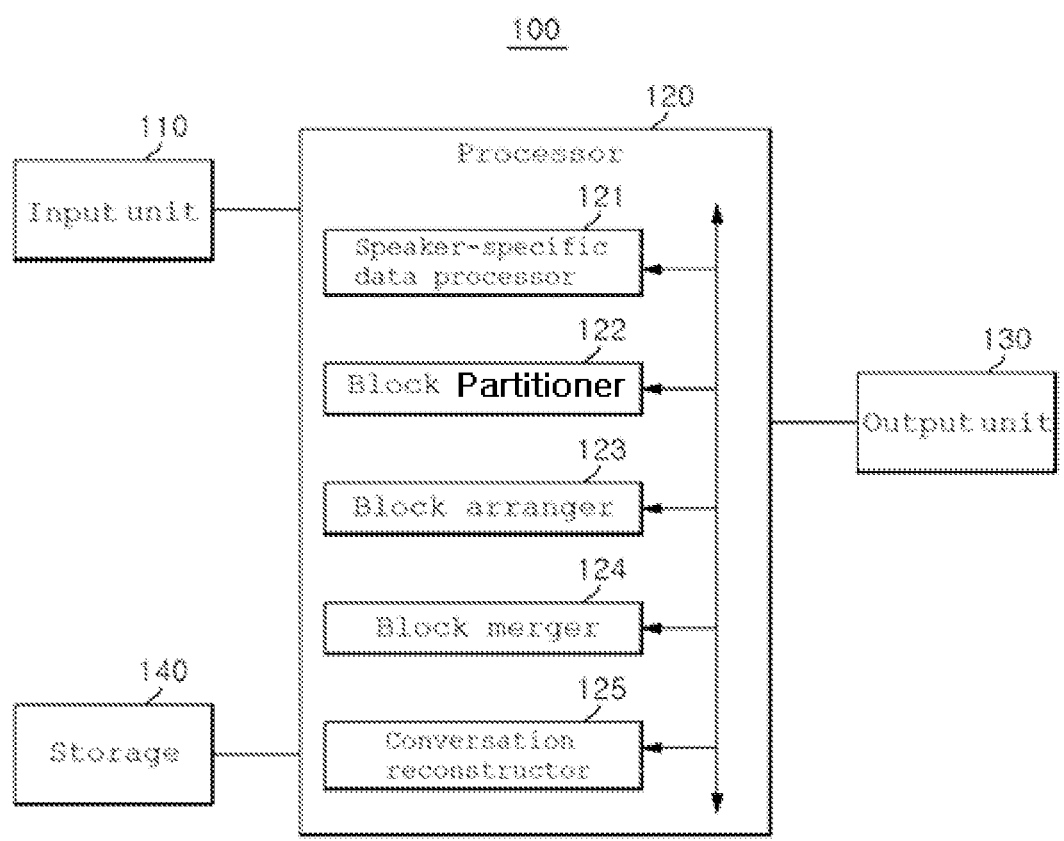
FIG. 1 is a configuration diagram of a voice conversation reconstruction apparatus according to one embodiment.

The same reference numbers in different figures denote the same or similar elements, and as such perform similar functionality. Further, descriptions and details of well-known steps and elements are omitted for simplicity of description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terms used in this specification will be briefly described, and then embodiments of the present disclosure will be described in detail.

Although the terms used in this specification are selected, as much as possible, from general terms that are widely used at present while taking into consideration the functions obtained in accordance with at least one embodiment, these terms may be replaced by other terms based on intentions of those skilled in the art, judicial precedent, emergence of new technologies, or the like. Additionally, in a particular case, terms that are arbitrarily selected by the applicant may be used. In this case, meanings of these terms will be disclosed in detail in the corresponding description of the present disclosure. Accordingly, the terms used herein should be defined based on practical meanings thereof and the whole content of this specification, rather than being simply construed based on names of the terms.

It will be further understood that the terms "comprises," "comprising," "includes," and "including" when used in this specification, specify the presence of the stated features, integers, operations, elements, and/or components, but do not preclude the presence or addition of one or more other features, integers, operations, elements, components, and/or portions thereof.

Further, as used herein, "unit" means software or hardware such as an FPGA or ASIC. The "unit" performs a specific function. However, the "unit" is not limited to software or hardware. The "unit" may be configured to reside in an addressable storage medium and may be configured to be executed by one or more processors. Thus, in an example, the "unit" may include software, object-oriented software, classes, tasks, processes, functions, attributes, procedures, subroutines, code segments, drivers, firmware, microcode, circuits, data, databases, data structures, tables, arrays, and variables. The unit or the component may be divided into subunits. Units or components may be combined into a single unit or component.

Hereinafter, embodiments of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a configuration diagram of a voice conversation reconstruction apparatus according to one embodiment.

Referring to FIG. 1, a voice conversation reconstruction apparatus 100 may include an input unit 110 and a processor 120, and may further include an output unit 130 and/or a storage 140. The processor 120 may include a speaker-specific data processor 121, a block partitioner 122, a block arranger 123, a block merger 124, and a conversation reconstructor 125.

The input unit 110 receives voice conversation. The input unit 110 may individually receive voice data about voice conversation per speaker. For example, the input unit 110 may include the number of microphones that correspond to the number of speakers in a one-to-one manner.

The processor 120 processes voice recognition for the voice conversation as received through the input unit 110. For example, the processor 120 may include computing means such as a microprocessor or the like.

The speaker-specific data processor 121 of the processor 120 acquires speaker-specific voice recognition data about the voice conversation. For example, the speaker-specific data processor 121 may include ASR (Automatic Speech Recognition). The ASR may remove noise via preprocessing of the speaker-specific voice data input through the input unit 110 and extract a character string therefrom. The speaker-specific data processor 121 may apply a plurality of recognition result generation times in obtaining the speaker-specific voice recognition data. For example, the speaker-specific data processor 121 may generate a speaker-specific recognition result A about the voice conversation on an EPD (End Point Detection) basis, and generate a speaker-specific recognition result B which is a partial result. For example, the speaker-specific recognition result B may be generated after a last EPD at which the speaker-specific recognition result A is generated occurs. In addition, the speaker-specific data processor 121 may collect the speaker-specific recognition result A and the speaker-specific recognition result B per speaker without overlap and redundance therebetween to generate the speaker-specific voice recognition data. In another example, the speaker-specific data processor 121 may apply a single recognition result generation time point in acquiring the speaker-specific voice recognition data. For example, only one of the speaker-specific recognition result A and the speaker-specific recognition result B may be generated.

The block partitioner 122 of the processor 120 divides the speaker-specific voice recognition data acquired by the speaker-specific data processor 121 into a plurality of blocks using a boundary between tokens according to a predefined division criterion. For example, the predefined division criterion may be a silent period longer than a predetermined time duration or a morpheme feature related to a previous token.

The block arranger 123 of the processor 120 may arrange the plurality of blocks divided by the block partitioner 122 in chronological order regardless of the speaker.

The block merger 124 of the processor 120 may merge blocks related to continuous utterance of the same speaker among the plurality of blocks aligned by the block arranger 123.

The conversation reconstructor 125 of the processor 120 may reconstruct the plurality of blocks reflecting as merged by the block merger 124 in a conversation format based on the chronological order and the speaker.

The output unit 130 outputs the processing result from the processor 120. For example, the output unit 130 may include an output interface, and may output converted data provided from the processor 120 to another electronic device connected to the output interface under the control of the processor 120. Alternatively, the output unit 130 may include a network card, and may transmit the converted data provided from the processor 120 through a network under the control of the processor 120. Alternatively, the output unit 130 may include a display apparatus capable of displaying the processing result from the processor 120 on a screen, and may display the voice recognition data about the voice conversation as reconstructed in the conversation format using the conversation reconstructor 125 based on the speaker and the chronological order.

The storage 140 may store therein an operating system program for the voice conversation reconstruction apparatus 100, and the processing result by the processor 120. For example, the storage 140 may include a computer-readable recording medium such as a magnetic medium such as a hard disk, a floppy disk, and magnetic tape, optical media such as a CD-ROM or DVD, a magneto-optical medium such as a floptical disk, and a hardware apparatus specially configured to store and execute program instructions such as a flash memory.

Figure 2:
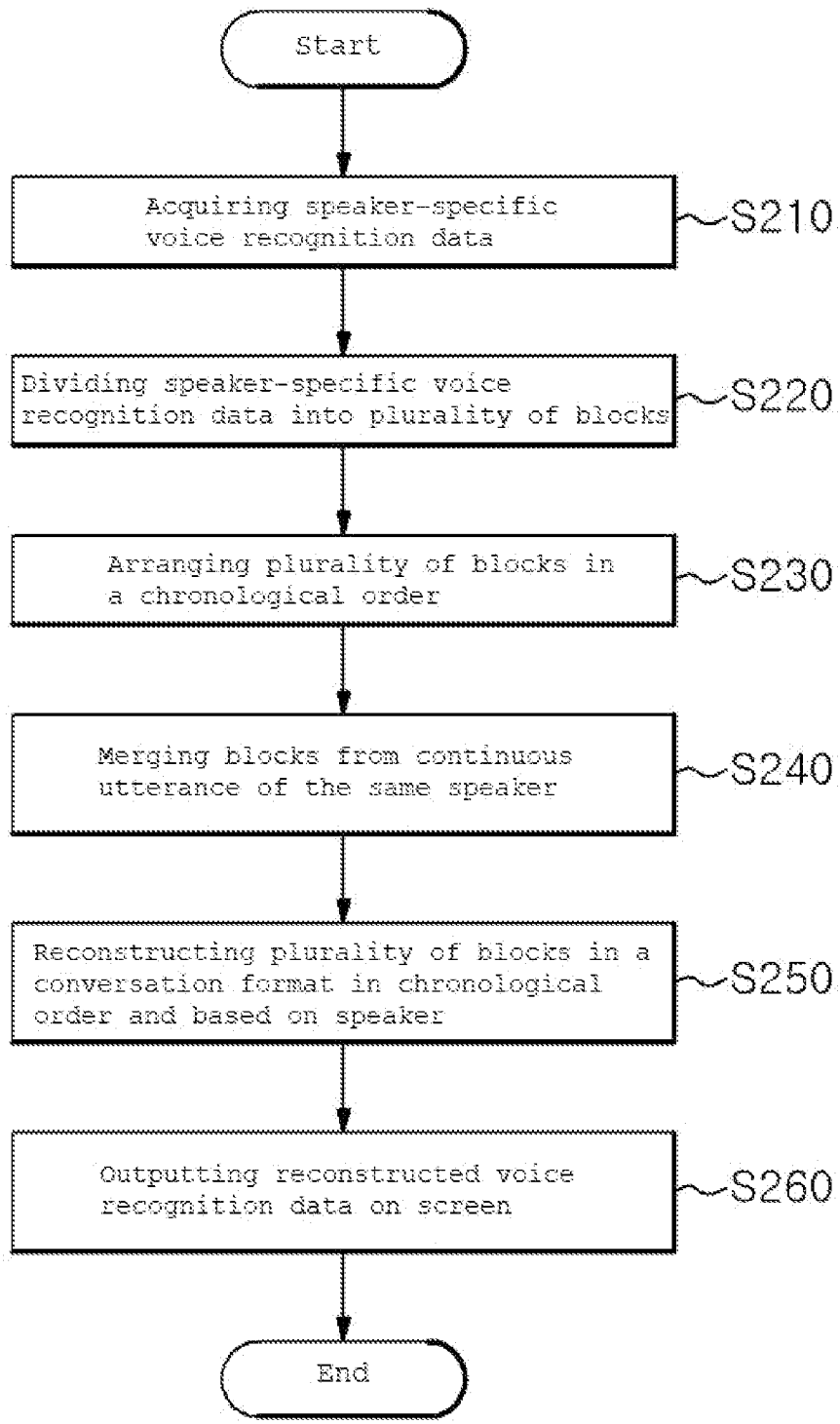
FIG. 2 is a flowchart for illustration of a voice conversation reconstruction method according to one embodiment.
Figure 3:
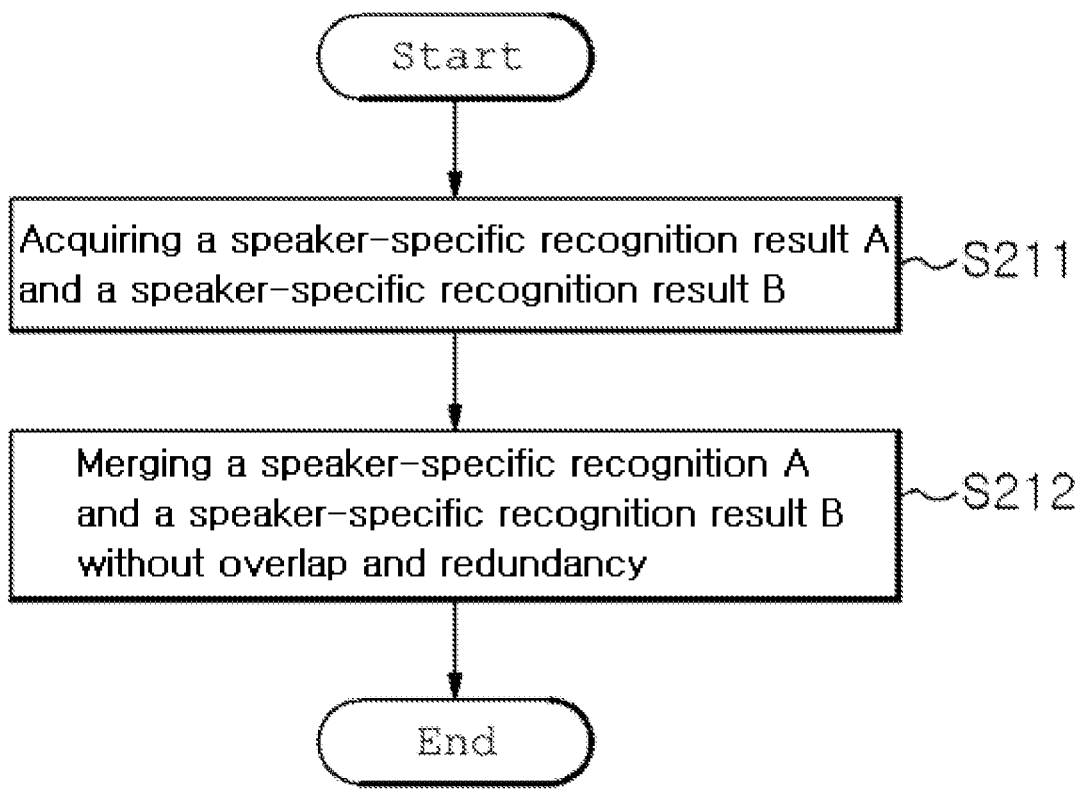
FIG. 3 is a flowchart illustrating a process of acquiring voice recognition data per speaker in the voice conversation reconstruction method according to one embodiment.
Figure 4:
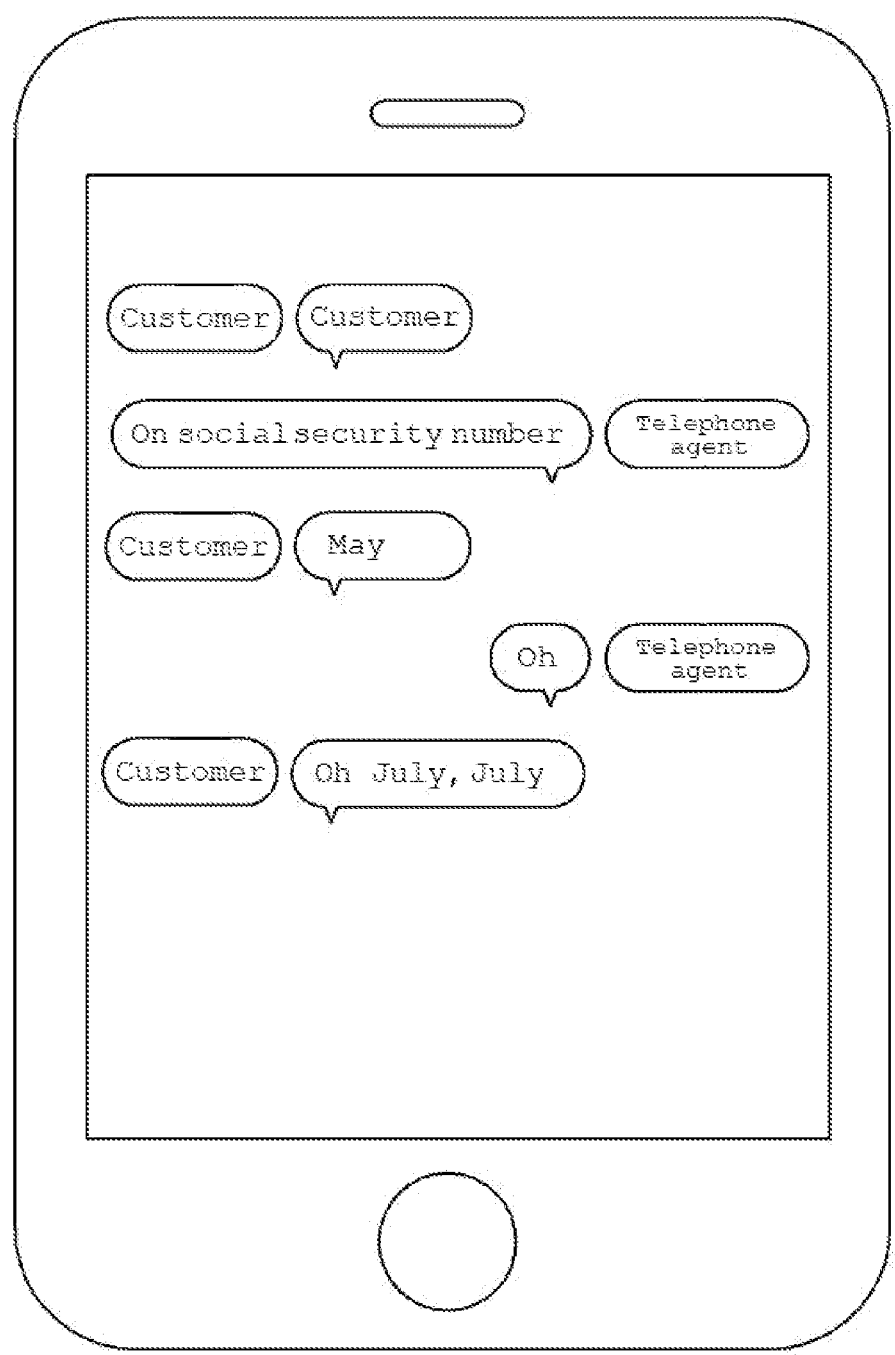
FIG. 4 is a diagram illustrating a result of voice conversation reconstruction using the voice conversation reconstruction apparatus according to one embodiment.

FIG. 2 is a flowchart for illustration of a voice conversation reconstruction method according to one embodiment. FIG. 3 is a flowchart illustrating a process of acquiring the voice recognition data per speaker in the voice conversation reconstruction method according to one embodiment. FIG. 4 is a diagram illustrating a result of the voice conversation reconstruction using the voice conversation reconstruction apparatus according to one embodiment.

Hereinafter, the voice conversation reconstruction method performed by the voice conversation reconstruction apparatus 100 according to one embodiment of the present disclosure will be described in detail with reference to FIG. 1 to FIG. 4.

First, the input unit 110 individually receives voice data about the voice conversation per speaker, and provides the received speaker-specific voice data to the processor 120.

Then, the speaker-specific data processor 121 of the processor 120 acquires the speaker-specific voice recognition data about the voice conversation. For example, the ASR included in the speaker-specific data processor 121 may remove noise via a preprocessing process of the speaker-specific voice data input through the input unit 110a and may extract the character string therefrom to obtain the speaker-specific voice recognition data composed of the character string S210.

In connection therewith, the speaker-specific data processor 121 may apply a plurality of timings at which the recognition result is generated in obtaining the speaker-specific voice recognition data. The speaker-specific data processor 121 generates the speaker-specific recognition result A about the voice conversation on the EPD basis. In addition, the speaker-specific data processor 121 generates the speaker-specific recognition result B after the last EPD at which the speaker-specific recognition result A is generated occurs S211. In addition, the speaker-specific data processor 121 collects the speaker-specific recognition result A and the speaker-specific recognition result B per speaker without overlap and redundance therebetween, and finally generates the speaker-specific voice recognition data (S212).

The speaker-specific voice recognition data acquired by the speaker-specific data processor 121 may be reconstructed into a conversation format later using the conversation reconstructor 125. However, in reconstruction of the data into the conversation format having a text format other than the voice, a situation may occur in which a second speaker interjects during a first speaker's speech. When trying to present this situation in the text format, the apparatus has to determine a point corresponding to the second speaker utterance. For example, the apparatus may divide the entire conversation duration into the data of all speakers based on the silence section, then collect the data of all speakers and arrange the data in chronological order. In this case, when text is additionally recognized around the EPD, a length of the text may be added to the screen at once. Thus, the position in text the user is reading may be disturbed by the construction of the conversation may change. Further, in connection therewith, when a construction unit of the conversation is natural, the context of the conversation is damaged. For example, when the second speaker utters "OK" during the continuous speech from the first speaker, the "OK" may not be expressed in the actual context and may be attached to an end portion of the continuous long word from the first speaker. Further, in connection therewith, in terms of the real time response, the recognition result may not be identified on the screen until EPD occurs even though the speaker is speaking and recognizing the speech. Rather, despite the first speaker speaking first, the word from the second speaker later is short and thus terminates before the speech from the first speaker terminates. Thus, a situation may occur where there is no word from the first speaker on the screen, but only the words from the second speaker are displayed on the screen. In order to cope with these various situations, the voice conversation reconstruction apparatus 100 according to one embodiment may execute the block generation process by the block partitioner 122, the arrangement process by the block arranger 123, and the merging process by the block merger 124. The block generation process and the arrangement process serve to insert the words of another speaker between the words of one speaker to satisfy an original conversation flow. The merging process is intended to prevent a sentence constituting the conversation from being divided into excessively short portions due to generation of blocks as performed for the insertion.

The block partitioner 122 of the processor 120 divides the speaker-specific voice recognition data acquired by the speaker-specific data processor 121 into a plurality of blocks according to the predefined division criterion, for example, using a boundary between tokens (words/phrases/morphemes) and may provide the plurality of blocks to the block arranger 123 of the processor 120. For example, the predefined division criterion may be a silent period longer than or equal to a predetermined time duration or a morpheme feature (for example, between words) related to the previous token. The block partitioner 122 may divide the speaker-specific voice recognition data into a plurality of blocks using the silent section of the predetermined time or longer or the morpheme feature related to the previous token as the division criterion (S220).

Subsequently, the block arranger 123 of the processor 120 arranges the plurality of blocks generated by the block partitioner 122 in chronological order irrespective of the speaker and provides the arranged blocks to the block merger 124 of the processor 120. For example, the block arranger 123 may use a start time of each block as the arrangement criterion, or may use a middle time of each block as the arrangement criterion (S230).

Then, the block merger 124 of the processor 120 may merge blocks from the continuous utterance of the same speaker among the plurality of blocks arranged by the block arranger 123, and may provide the speaker-specific voice recognition data as the results of the block merging to the conversation reconstructor 125. For example, the block merger 124 may determine the continuous utterance of the same speaker based on the silent section of a predetermined time duration or smaller between the previous block and the current block or the syntax feature between the previous block and the current block (for example, when the previous block is an end portion of a sentence) (S240).

Next, the conversation reconstructor 125 of the processor 120 reconstructs the plurality of blocks as the merging result by the block merger 124 in the conversation format in the chronological order and based on the speaker, and provides the reconstructed voice recognition data to the output unit 130 (S250).

Then, the output unit 130 outputs the processing result from the processor 120. For example, the output unit 130 may output the converted data provided from the processor 120 to another electronic device connected to the output interface under the control of the processor 120. Alternatively, the output unit 130 may transmit the converted data provided from the processor 120 through the network under the control of the processor 120. Alternatively, the output unit 130 may display the processing result by the processor 120 on the screen of the display apparatus as shown in FIG. 4. As shown in an example of FIG. 4, the output unit 130 may display the voice recognition data about the voice conversation as reconstructed in a conversation format using the conversation reconstructor 125 on the screen in chronological order and based on the speaker. In connection therewith, when updating and outputting the reconstructed voice recognition data, the output unit 130 may update and output a screen reflecting the speaker-specific recognition result A generated in step S211. That is, in step S250, the conversation reconstructor 125 provides the voice recognition data reflecting the speaker-specific recognition result A to the output unit 130 (S260).

FIG. 5 shows a step-by-step example of a method for reconstructing a voice conversation according to an embodiment.

Referring to FIG. 5, it shows when a current time is recognized (uttered) up to T13. S210 corresponds to an acquisition step. In S210, one line represents one piece of acquired data, and each line is arranged in the order of the last acquisition (update). The acquired order may be understood from T4, T6, T10, T12, and T13 at the end of each line. Since they are arranged in the updated order, it may be understood that the first part of each line is T4, T1, T10, T7, and T13, which is not in chronological order.

As such, when they are arranged based on the first utterance of each line, it may be understood that the end utterances of each line are not in chronological order.

In addition, T4 of E2 is uttered later than T1 and earlier than T6 in time because T1 to T6 of E1 are single units. However, in the example of S210, it may not be placed in an accurate position based on utterance.

In general, since the recognition result uses a specific time range of a specific speaker as a single unit, the example of S210 also expresses the recognition result of a specific time range of a specific speaker as a single line.

S220 corresponds to a partitioning step. S220 represents the partitioning of the recognition result of the unit corresponding to a sentence into token units. It may be understood that the sentence division is lost and speaker information is assigned to each token.

S230 corresponds to an alignment step. S230 arranges each token of S220 in chronological order. It may be seen that they are arranged in order from T1 to T13.

S240 corresponds to a merging step. In S240, in the result of S230, when neighboring speakers are the same, they are merged into one. In S240, one line is one merging result.

In comparison of the results of S210 and S240, it may be understood that the time boundary of the expression unit and the expression order are changed.

S250 corresponds to a reconstruction step. S250 reconstructs the result of S240 to be displayed on a screen. There is no change in the unit boundaries, the order of speakers, or the order of recognition results.

S260 corresponds to an output step. It may be understood that S260 is expressed in chronological order from T1 to T13. Herein, the point to pay attention is that T13 is the content of the utterance at a current time, and it is expressed in chronological order, including all recent recognition results including partial results.

Further, each of the steps included in the voice conversation reconstruction method according to the above-described one embodiment may be implemented in a computer-readable recording medium that records therein a computer program including instructions for performing these steps.

Further, each of the steps included in the voice conversation reconstruction method according to the above-described one embodiment may be implemented as a computer program stored in a computer-readable recording medium so as to include instructions for performing these steps.

As described above, according to the embodiment of the present disclosure, in reconstruction of the speaker-specific voice recognition data about the voice conversation in the conversation format, a conversation reconstruction as close as possible to the flow of actual conversation may be realized.

Further, the conversation is reconstructed based on the partial result as the voice recognition result generated every predetermined time during the voice conversation. Thus, the conversation converted in real time may be identified and the real-time voice recognition result may be considered. Thus, an amount of conversation updated once when the voice recognition result is displayed on a screen may be small. Thus, the reconstruction of the conversation may be well arranged, and change in a reading position on the screen is relatively small, thereby realizing high readability and recognition ability.

Combinations of the steps in each flowchart attached to the present disclosure may be performed using computer program instructions. These computer program instructions may be installed on a processor of a general purpose computer, a special purpose computer or other programmable data processing equipment. Thus, the instructions as executed by the processor of the computer or other programmable data processing equipment may create means to perform the functions as described in the steps of the flowchart. These computer program instructions may be stored on a computer-usable or computer-readable recording medium that may be coupled to a computer or other programmable data processing equipment to implement functions in a specific manner. The instructions stored on the computer usable or computer readable recording medium may constitute an article of manufacture containing the instruction means for performing the functions described in the steps of the flowchart. Computer program instructions may also be installed on a computer or other programmable data processing equipment. Thus, a series of operational steps is performed on a computer or other programmable data processing equipment to create a computer-executable process. Thus, instructions to be executed by a computer or other programmable data processing equipment may provide the steps for performing the functions described in the steps of the flowchart.

Further, each step may correspond to a module, a segment, or a portion of a code including one or more executable instructions for executing the specified logical functions. It should also be noted that in some alternative embodiments, the functions mentioned in the steps may occur out of order. For example, two steps shown in succession may in fact be performed substantially simultaneously, or the steps may sometimes be performed in reverse order depending on a corresponding function.

According to one embodiment, in reconstruction of speaker-specific voice recognition data about voice conversation in a conversation format, conversation construction as close to the flow of actual conversation as possible may be provided.

Further, the conversation is reconstructed based on the partial result as the voice recognition result generated every predetermined time during the voice conversation. Thus, the conversation converted in real time may be identified and the real-time voice recognition result may be considered. Thus, an amount of conversation updated once when the voice recognition result is displayed on a screen may be small. Thus, the construction of the conversation may be well arranged, and change in reading position on the screen may be relatively small, thereby realizing high readability and recognizability.

The above description is merely an illustrative description of the technical idea of the present disclosure. A person with ordinary knowledge in the technical field to which the present disclosure belongs will be able to make various modifications and changes within the scope of the essential quality of the present disclosure. Accordingly, the embodiments disclosed in the present disclosure are not intended to limit the technical idea of the present disclosure, but are for illustration. The scope of the technical idea of the present disclosure is not limited by this embodiment. The scope of protection of the present disclosure should be interpreted by the claims below. All technical ideas within the scope equivalent thereto should be interpreted as being included in the scope of the present disclosure.

What is claimed is:

1. A voice conversation reconstruction method performed by a voice conversation reconstruction apparatus, the method comprising:
    acquiring a plurality of speaker-specific voice recognition data corresponding to a plurality of speakers about voice conversation;
    dividing each of the plurality of the speaker-specific voice recognition data into a plurality of blocks using a boundary between tokens such that each of the divided plurality of the speaker-specific voice recognition data includes voice data only by a single speaker, wherein the divided plurality of the speaker-specific voice recognition data are not in chronological order;
    arranging the plurality of blocks of all the speaker-specific voice recognition data in chronological order without distinction of speaker;
    among the arranged plurality of blocks, merging blocks when the blocks are neighbor and the speaker of the blocks are the same such that the speaker-specific voice recognition data in each of the merged blocks are in chronological order and include voice data only by the same speaker; and
    reconstructing the plurality of blocks subjected to the merging in a conversation format in chronological order and based on a speaker step by step such that the speaker-specific voice recognition data in each of the reconstructed blocks are in chronological order and include voice data only by the same speaker,
    wherein the steps are performed in order,
    wherein acquiring the plurality of speaker-specific voice recognition data includes:
        acquiring a first speaker-specific recognition result generated on an End Point Detection (EPD), and a second speaker-specific recognition result generated every preset time, and
        collecting the first speaker-specific recognition result and the second speaker-specific recognition result without overlap and redundance therebetween to generate the speaker-specific voice recognition data, and
    wherein the second speaker-specific recognition result is generated after a last EPD at which the first speaker-specific recognition result is generated occurs.

2. The method of claim 1, wherein acquiring the speaker-specific voice recognition data includes:
    acquiring a speaker-specific recognition result A generated on an EPD (End Point Detection) basis from the voice conversation and a speaker-specific recognition result B which is a partial result generated from the voice conversation; and
    when the speaker of the A and the speaker of the B are the same, collecting the recognition result A and the recognition result B without overlap therebetween to generate the speaker-specific voice recognition data.

3. The method of claim 2, wherein the second speaker-specific recognition result B is generated after the same speaker's last EPD occurs.

4. The method of claim 1, wherein the merging is not performed when a silence period between neighboring tokens is longer than a predetermined time, or is not grammatically connected.

5. The method of claim 2, wherein the method further comprises outputting the voice recognition data reconstructed in the conversation format on a screen, and wherein when the screen is updated, the speaker-specific voice recognition data is collectively updated or is updated based on the speaker-specific recognition result B.

6. A voice conversation reconstruction apparatus comprising:
an input unit configured to receive voice conversation input; and
a processor configured to process voice recognition of the voice conversation received through the input unit,
wherein the processor is configured to:
acquire a plurality of speaker-specific voice recognition data corresponding to a plurality of speakers about voice conversation;
divide each of the plurality of the speaker-specific voice recognition data into a plurality of blocks using a boundary between tokens such that each of the divided plurality of the speaker-specific voice recognition data includes voice data only by a single speaker, wherein the divided plurality of the speaker-specific voice recognition data are not in chronological order;
arrange the plurality of blocks of all the speaker-specific voice recognition data in chronological order without distinction of speaker;
merge blocks when the blocks are neighbor and the speaker of the blocks are the same such that the speaker-specific voice recognition data in each of the merged blocks are in chronological order and include voice data only by the same speaker; and
reconstruct the plurality of blocks subjected to the merging in a conversation format in chronological order and based on a speaker such that the speaker-specific voice recognition data in each of the reconstructed blocks are in chronological order and include voice data only by the same speaker,
wherein the processor is further configured to:
acquire a first speaker-specific recognition result generated on an End Point Detection (EPD), and a second speaker-specific recognition result generated every preset time, and
collect the first speaker-specific recognition result and the second speaker-specific recognition result without overlap and redundance therebetween to generate the speaker-specific voice recognition data, and
wherein the second speaker-specific recognition result is configured to be generated after a last EPD at which the first speaker-specific recognition result is generated occurs.

7. The apparatus of claim 6, wherein the processor is further configured to:

acquire a speaker-specific recognition result A generated on an EPD (End Point Detection) basis from the voice conversation and a speaker-specific recognition result B which is a partial result generated from the voice conversation; and
collect the speaker-specific recognition result A and the speaker-specific recognition result B without overlap and redundance therebetween to generate the speaker-specific voice recognition data.

8. A non-transitory computer-readable recording medium storing instructions, when executed by one or more processors, that cause the one or more processors to perform a method comprising:
acquiring a plurality of speaker-specific voice recognition data corresponding to a plurality of speakers about voice conversation;
dividing each of the plurality of the speaker-specific voice recognition data into a plurality of blocks using a boundary between tokens such that each of the divided plurality of the speaker-specific voice recognition data includes voice data only by a single speaker, wherein the divided plurality of the speaker-specific voice recognition data are not in chronological order;
arranging the plurality of blocks of all the speaker-specific voice recognition data in chronological order without distinction of speaker;
among the arranged plurality of blocks, merging blocks when the blocks are neighbor and the speaker of the blocks are the same such that the speaker-specific voice recognition data in each of the merged blocks are in chronological order and include voice data only by the same speaker; and
reconstructing the plurality of blocks subjected to the merging in a conversation format in chronological order and based on a speaker step by step such that the speaker-specific voice recognition data in each of the reconstructed blocks are in chronological order and include voice data only by the same speaker,
wherein the steps are performed in order,
wherein acquiring the plurality of speaker-specific voice recognition data includes:
acquiring a first speaker-specific recognition result generated on an End Point Detection (EPD), and a second speaker-specific recognition result generated every preset time, and
collecting the first speaker-specific recognition result and the second speaker-specific recognition result without overlap and redundance therebetween to generate the speaker-specific voice recognition data, and
wherein the second speaker-specific recognition result is generated after a last EPD at which the first speaker-specific recognition result is generated occurs.

* * * * *